US012070692B2

(12) United States Patent
Farudi et al.

(10) Patent No.: US 12,070,692 B2
(45) Date of Patent: *Aug. 27, 2024

(54) IMMERSIVE INTERACTIVE SPORTS MANAGEMENT SYSTEM AND METHOD THEREOF

(71) Applicant: Project Fanchise Technology LLC, Hermosa Beach, CA (US)

(72) Inventors: Sohrob Farudi, Temecula, CA (US); Steven Adler, San Diego, CA (US); Raymond Austin, Hermosa Beach, CA (US); Grant Cohen, Hermosa Beach, CA (US); Patrick Dees, Hermosa Beach, CA (US)

(73) Assignee: Project Fanchise Technology LLC, Hermosa Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,429

(22) Filed: Apr. 4, 2023

(65) Prior Publication Data

US 2023/0241508 A1    Aug. 3, 2023

Related U.S. Application Data

(63) Continuation of application No. 17/013,692, filed on Sep. 7, 2020, now Pat. No. 11,638,876, which is a
(Continued)

(51) Int. Cl.
*A63B 71/06* (2006.01)
*A63F 13/335* (2014.01)
(Continued)

(52) U.S. Cl.
CPC .............. *A63F 13/65* (2014.09); *A63B 71/06* (2013.01); *A63B 71/0616* (2013.01);
(Continued)

(58) Field of Classification Search
CPC . A63B 71/06; A63B 71/0616; A63B 71/0622; A63B 2225/20; A63B 2225/50;
(Continued)

(56) References Cited

U.S. PATENT DOCUMENTS 5,508,731 A    4/1996 Kohorn
5,860,862 A    1/1999 Junkin
(Continued)

*Primary Examiner* — Lawrence S Galka
(74) *Attorney, Agent, or Firm* — Cooley LLP

(57) ABSTRACT

Described herein are computerized methods and systems for enabling remote participation in sporting event decision-making. A current game situation in a sporting event is received by a server from a remote device. The server retrieves plays applicable to the current game situation from a playbook. The server generates a playcall UI comprising the retrieved play categories and plays and transmits the playcall UI to fan computing devices. The server receives a vote for one of the plays from the fan computing devices. The server determines a selected play based on the received votes. The server transmits the selected play to player computing devices associated with players involved in the sporting event, wherein the players execute the selected play. The current game situation is updated at the remote device based upon an outcome of the selected play.

12 Claims, 4 Drawing Sheets

Related U.S. Application Data continuation of application No. 16/747,074, filed on Jan. 20, 2020, now abandoned, which is a continuation-in-part of application No. 15/859,155, filed on Dec. 29, 2017, now Pat. No. 10,537,807.

(60) Provisional application No. 62/440,731, filed on Dec. 30, 2016.

(51) Int. Cl.

| | | |
|---|---|---|
| *A63F 13/65* | (2014.01) | |
| *A63F 13/798* | (2014.01) | |
| *A63F 13/812* | (2014.01) | |
| *A63F 13/847* | (2014.01) | |
| *H04L 9/06* | (2006.01) | |
| *H04L 9/32* | (2006.01) | |
| *H04L 9/00* | (2022.01) | |

(52) U.S. Cl.
CPC ........ *A63B 71/0622* (2013.01); *A63F 13/335* (2014.09); *A63F 13/798* (2014.09); *A63F 13/812* (2014.09); *A63F 13/847* (2014.09); *H04L 9/0637* (2013.01); *H04L 9/3239* (2013.01); *H04L 9/50* (2022.05)

(58) Field of Classification Search
CPC ...... A63F 13/65; A63F 13/798; A63F 13/828; G06Q 10/06; H04N 21/4758
See application file for complete search history.

(56) References Cited

U.S. PATENT DOCUMENTS

| | | |
|---|---|---|
| 6,293,868 B1 | 9/2001 | Bernard |
| 6,996,413 B2 | 2/2006 | Inselberg |
| 7,743,070 B1 | 6/2010 | Blumberg |
| 9,751,018 B2 | 9/2017 | Colony et al. |
| 9,821,211 B2 | 11/2017 | Colony et al. |
| 9,878,250 B2 | 1/2018 | Colony et al. |
| 10,112,100 B2 | 10/2018 | Colony et al. |
| 10,537,807 B2 | 1/2020 | Farudi et al. |
| 11,638,876 B2 | 5/2023 | Farudi et al. |
| 2002/0119823 A1 | 8/2002 | Beuscher |
| 2008/0268929 A1 | 10/2008 | Billmaier et al. |
| 2008/0311996 A1* | 12/2008 | Belton ................ H04N 21/252 348/E7.071 |
| 2009/0137298 A1 | 5/2009 | Bedingfield, Sr. et al. |
| 2010/0080390 A1 | 4/2010 | Daniel |
| 2013/0060362 A1 | 3/2013 | Murphy et al. |
| 2013/0139068 A1 | 5/2013 | Bowring |
| 2014/0236331 A1 | 8/2014 | Lehmann et al. |
| 2015/0082333 A1 | 3/2015 | Belton |
| 2015/0174467 A1 | 6/2015 | Colony et al. |
| 2015/0248817 A1 | 9/2015 | Steir et al. |
| 2016/0193521 A1* | 7/2016 | Colony ................ A63B 71/06 273/317 |
| 2016/0253919 A1 | 9/2016 | Coiner |
| 2016/0325186 A1 | 11/2016 | Colony et al. |
| 2017/0087472 A1* | 3/2017 | Moh ...................... A63F 13/25 |
| 2017/0109955 A1 | 4/2017 | Ernest et al. |
| 2018/0021682 A1 | 1/2018 | Colony et al. |
| 2018/0085652 A1 | 3/2018 | Colony et al. |

* cited by examiner

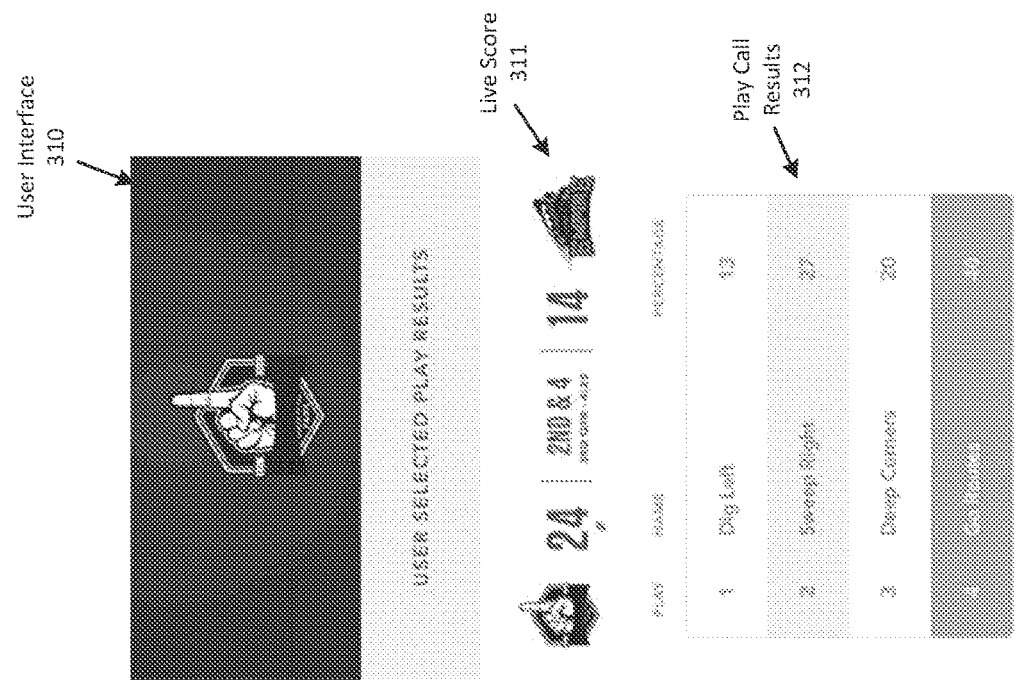
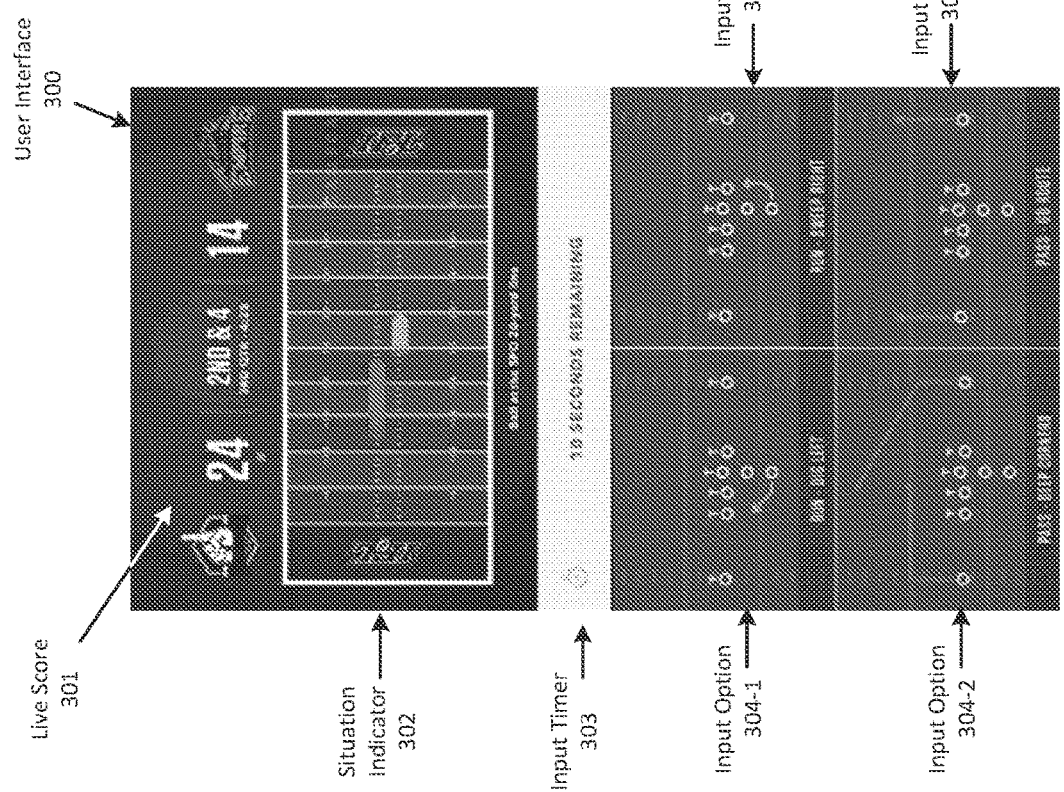
FIG. 3B
FIG. 3A

IMMERSIVE INTERACTIVE SPORTS MANAGEMENT SYSTEM AND METHOD THEREOF

RELATED APPLICATIONS

This application is a continuation of U.S. patent application Ser. No. 17/013,692, filed Sep. 7, 2020, which is a continuation of U.S. patent application Ser. No. 16/747,074, filed on Jan. 20, 2020, which is a continuation-in-part of U.S. patent application Ser. No. 15/859,155, filed Dec. 29, 2017, now U.S. Pat. No. 10,537,807, which claims priority to U.S. Provisional Patent Application No. 62/440,731, filed Dec. 30, 2016, all of which are incorporated herein by reference in their entirety.

TECHNICAL FIELD

This subject matter of this application relates generally to computerized methods and apparatuses, including computer program products, for providing fans with the ability to control live, on-field decision-making for sporting events and other competitions—including the introduction of a unique cryptographic utility token that drives decision-making and engagement for fans of such events.

BACKGROUND

Sporting events have long been spectator events in which fans watch as spectators, rather than participate as active participants that are able to control, or influence, the game-play unfolding on the field. Fantasy sports systems enable fans to use their computing devices—such as smartphones and other mobile devices—to select rosters of players whose on-field performance will be attributed to their "fantasy team" for purposes of generating a team score. While such fantasy leagues increase fan interest in the actual sporting events, fan participation and decision-making in such leagues has no bearing on the underlying real-world competitions and sporting events.

Recently, some systems have been introduced that enable a modicum of fan participation in the live, real-time strategy taking place during a sporting event. For example, certain systems allow fans to vote on a strategy decision (e.g., playcalling, substitutions) using a limited number of options typically selected in real-time by a coach, and have the 'winning' outcome be relayed to a device operated by the coach on the sideline to implement the strategy. In those systems, however, there are two deficiencies that lead to less-than-optimal engagement with the fan: 1) the coach has tight control over the set of options available for fans to choose from; and 2) the coach retains the ability to use his own judgment to either accept the outcome as voted by the fans or make his own decision that is independent from the fans' choice—thereby limiting the effect that fan decision-making can have on the actual game.

To improve fan participation and interest, a solution to provide a transparent, immersive and interactive sports management experience, in which fan participation can have immediate, real-world effects on the field, pitch, or court, is desired. Transparency in the voting and decision-making process is a key factor to providing a trusted system for fans and for players in the game.

SUMMARY

Therefore, what is needed are methods and systems for interactive sports management that provides an immersive, transparent experience to a plurality of users to participate in various aspects of the management of live-action sports teams comprising a plurality of players. In doing so, the interactive sports management system allows each of the plurality of users to be associated with a team and participate in various decision-making processes of the associated team. It should be appreciated that although the examples provided herein relate to the sport of American football, the systems, methods, and techniques are also applicable to any number of other sports, sports leagues, and/or competitions (e.g., e-sports).

Among other benefits, examples described herein achieve a technical effect of improving user experience associated with supporting a live-action sports team. Various example interactive sports management system described herein enable users (e.g., fans) to be fully engaged, connected, and immersed in the management of their respective teams.

The invention, in one aspect, features a system for enabling remote participation in sporting event decision-making. The system comprises a server computing device having a processor and memory. The processor is configured to execute instructions stored in the memory to: receive one or more data elements relating to a current game situation in a sporting event from a remote computing device; retrieve a plurality of plays applicable to the current game situation from a playbook stored in a database, where each play in the playbook is assigned to one or more buckets that define a specific game situation and the server computing device identifies the plurality of plays for retrieval by comparing the current game situation to the specific game situation associated with one or more of the buckets; generate a playcall user interface comprising the plurality of retrieved plays and transmit the playcall user interface to a plurality of fan computing devices associated with fans of the sporting event; receive a vote for one of the plurality of retrieved plays from each of the plurality of user computer devices; determine a selected play of the plurality of retrieved plays based on the received votes; transmit the selected play to one or more player computing devices associated with players involved in the sporting event, where the player computing devices display the selected play to the players and the players execute the selected play during the sporting event; and update, at the remote computing device, the current game situation in the sporting event based upon an outcome of the execution of the selected play.

The invention, in another aspect, features a computerized method of enabling remote participation in sporting event decision-making. A server computing device receives one or more data elements relating to a current game situation in a sporting event from a remote computing device. The server computing device retrieves a plurality of plays applicable to the current game situation from a playbook stored in a database, where each play in the playbook is assigned to one or more buckets that define a specific game situation and the server computing device identifies the plurality of plays for retrieval by comparing the current game situation to the specific game situation associated with one or more of the buckets. The server computing device generates a playcall user interface comprising the plurality of retrieved plays and transmitting the playcall user interface to a plurality of fan computing devices associated with fans of the sporting event. The server computing device receives a vote for one of the plurality of retrieved plays from each of the plurality of user computer devices. The server computing device determines a selected play of the plurality of retrieved plays based on the received votes. The server computing device transmits the selected play to one or more player computing devices associated with players involved in the sporting event, where the player computing devices display the selected play to the players and the players carry out the selected play during the sporting event. The current game situation in the sporting event is updated at the remote computing device based upon an outcome of the execution of the selected play.

Any of the above aspects can include one or more of the following features. In some embodiments, the sporting event is an American football game. In some embodiments, the one or more data elements relating to the current game situation comprise down, distance, time remaining, score, or any combination thereof. In some embodiments, the specific game situation assigned to each of the one or more buckets comprises one or more of: down, distance, time remaining, or score. In some embodiments, the server computing device matches at least one of the one or more data elements relating to the current game situation to the specific game situation assigned to one or more of the buckets to identify the plurality of plays for retrieval. In some embodiments, the playcall user interface comprises a display of each of the plurality of retrieved plays in a grid format, and each of the displayed plays is associated with an input that, when selected by a user of the fan computing device, transmits a vote for the displayed play to the server computing device. In other embodiments, the sporting event is an American baseball game. In other embodiments, the one or more data elements relating to the current game situation comprise player at bat, team at bat, runners on base, player pitching, players in field positions, inning, top or bottom of inning, score, or any combination thereof. In other embodiments, the specific game situation assigned to each of the one or more buckets comprises one or more of: player at bat, team at bat, runners on base, player pitching, players in field positions, inning, top or bottom of inning or score. In other embodiments, the server computing device matches at least one of the one or more data elements relating to the current game situation to the specific game situation assigned to one or more of the buckets to identify the plurality of categories of plays and the plurality of plays within those categories for retrieval. In other embodiments, the category selection portion of the playcall user interface comprises a display of each of the plurality of categories of plays in a grid format, and each of the displayed categories is associated with an input that, when selected by a user of the fan computing device, instantiates the play selection portion of the playcall user interface, which comprises a display of each of the plurality of retrieved plays corresponding to the selected category in a grid format, and each of the displayed plays is associated with an input that, when selected by a user of the fan computing device, transmits a vote for the displayed play to the server computing device.

In some embodiments, each of the plurality of fan computing devices comprises a fan profile associated with a user of the fan computing device. In some embodiments, the fan profile comprises a ranking of the associated user. In some embodiments, the ranking of the associated user is based on one or more of: the user's interactions with the server computing device during the sporting event, or the user's interactions with the server computing device during one or more previous sporting events. In some embodiments, determining a selected play of the plurality of retrieved plays based on the received votes comprises: determining a weight for each of the received votes using the ranking of the associated user that submitted the vote; adjusting a value associated with each of the received votes based upon the determined weight for each of the received votes; and identifying a selected play of the plurality of retrieved plays based upon the adjusted values of each of the received votes. In some embodiments, the ranking of the associated user is based on a cryptocurrency token balance associated with the user. In some embodiments, the cryptocurrency token is based upon blockchain technology.

In some examples, the interactive sports management system can manage user profiles, each associated one of the plurality of users. The user profiles store various information pertaining to the corresponding user, including an associated team, a score used to rank the users associated with the team (e.g., a FanIQ score), a currency balance also used to rank the users associated with the team (e.g., a blockchain-based/cryptocurrency token balance), and historical activity in using or interacting with the interactive sports management system.

In various aspects, the interactive sports management system allows users to contribute to making decisions pertaining to their associated teams. The interactive sports management system can receive user input during the live sporting events and determine real-time decisions (e.g. real-time play calling decisions) pertaining to the team based on the received user input. The input of a user can be weighted by the interactive sports management system based on the user's ranking among users associated with the same team (e.g., fans of the team) in determining the real-time decisions. The system can transmit the real-time decisions to one or more of the plurality of players of the sports team at the appropriate times during the live sporting event (e.g., a certain amount of time before a play is run) such that the players can carry out the determined decision on the field. According to embodiments, real-time play call decisions determined by the interactive sports management system are communicated to the players and coaches of the team via enhanced private networks optimized to reduce latency and delays such that the players and coaches can implement the determined decisions in time on the field.

In certain implementations, the interactive sports management system can be configured to determine a score for each user based on, for example, the user's past activity in interacting with the interactive sports management system. Users of each sports team can be ranked based on their respective scores. The rankings of users associated with a particular sports team can be used to determine the weight assigned to each of the users' input in determining decisions for the team (e.g., a real-time live play calling decision). The input of a user having a higher rank, for example, can have greater weight in determining the decisions compared to a user having a lower rank.

In some examples, the interactive sports management system can determine a ranking score (e.g., a FanIQ score) and/or a ranking currency balance (e.g., using a blockchain-based token/cryptocurrency token) to rank a corresponding user among a plurality of users (e.g., a plurality of users associated with a particular team or a plurality of users registered with the interactive sports management system). The ranking score can be determined based on the user's knowledge of a sport (e.g., football, baseball, soccer, etc.), which can be measured through the user's interactions with the interactive sports management system. As one example way of determining or updating the ranking score, the user can be presented with a series of questions regarding the sport (e.g., questions regarding formations, play calls, history of the sport, current teams and players, etc.). The user's responses can be used to determine or update the user's score. For instance, incorrect responses to the questions can lower the user's score and correct responses can increase the user's score. In addition to or as an alternative, the interactive sports management system can determine or update the user's ranking score based on the user's input in voting for live play call selections during a live sporting event (e.g., a football game). In some examples, the interactive sports management system can increase the user's ranking score if the user's vote for a live play call selection is ultimately selected. In other examples, the interactive sports management system can determine or update the user's ranking score based on an in-game (e.g., on-the-field) result of the live play call. For instance, the interactive sports management system can increase the user's ranking score in the event that selected live play call results in a positive play on the field.

In other aspects, the interactive sports management system can keep track of in-game statistics pertaining to the user's input in voting for live play calls. The interactive sports management system can keep track of, for instance, a success rate of the user's vote in selecting play calls and in-game statistics resulting from the selection of the user's live play call input (e.g., a number of yards gained, a pass completion percentage, etc.). The interactive sports management system can rank users based on one or more of the tracked in-game statistics (e.g., users having the highest number of yards gained in a game). The interactive sports management system can also update the user's ranking score based on the tracked in-game statistics. In certain implementations, the interactive sports management system can rank the users based on the one or more of the tracked in-game statistics at the end of a sports season (e.g., rank users based on total number of yards gained, etc.).

As an example, during a live football game, the user's vote to select a running play can be ultimately selected by the interactive sports management system as the live play call decision. The user's football team can execute the running play on the field and gain six yards on the play. As another example, during a live baseball game, the user's vote to select a bunt play can be ultimately selected by the interactive sports management system as the live play call decision. The user's baseball team can execute the bunt play on the field and advance the runners into scoring position on the play.

In certain implementations, users can participate in online competitions that result in real-world benefits to their respective teams in live sporting events. For instance, users associated with two teams can compete online to determine real-world bonuses (e.g., bonus timeout, substitution, first down) to be applied during a live sporting event between the two teams.

In some examples, the interactive sports management system can select a number (e.g., ten or fifteen) of users to have greater involvement in the determination of live play calls for the team. In various examples, the selected users can be allowed to use dedicated terminals at a sporting venue (e.g., a stadium or an arena) to participate as "super fans."

In certain embodiments, the interactive sports management system uses a unique cryptographic utility token that drives all decision-making and engagement for active fans of, e.g., a sports league. The token, also called a FAN token, is a cryptographic token for use on the blockchain. The FAN token is the unit of power through which all interactivity is derived. Each fan's level of control is directly proportional to their ownership of FAN tokens, and the skill and frequency with which they engage with the sports league (e.g., via their computing devices) adds to their collection of tokens.

Aside from the practical use case of an easily-transacted utility of power, the cryptographic utility token leverages blockchain technology to bring a level of complete transparency, provided by an ongoing public ledger, to league operations and all fan votes. For fans to buy into the idea of decentralized, fluid decision making power, they need to be confident that their decisions yield the results they expect. The blockchain and ledger are the key to unlocking that democratization and providing trust in the system for all parties involved.

While FAN tokens are a literal measure of influence to a fan's voting power, whether it be for calling a play or selecting a new quarterback, the tokens also carry utility indirectly tied to league operations. FAN tokens enable fans to unlock tiers of access to content, voting rights, exclusive experiences with the league and its sponsors, merchandise, and, of course, the potential for a greater piece of the championship purse. In addition to purchasing FAN tokens in the token sale, fans are able to earn FAN tokens through a variety of reward-based programs designed to enhance fan involvement and engagement with the sports league.

Every aspect of fan engagement in the interactive sports management system is driven by the FAN token. An individual fan's power to influence their team's crucial decisions from making draft choices and free agent signings to in-game, real-time play calls—increases as their FAN token ownership increases. Holding certain amounts of FAN tokens also grants access to unique content, special perks, prizes, discounts and other FAN token-only rewards.

It should be appreciated that fan-engagement opportunities will continue to grow as public buy-in and audiences increase, and as technology continues to democratize access even beyond sports. Some benefits of owning FAN tokens include, but are not limited to:

Increased Coaching Power—Each team has a FAN token leaderboard which ranks fans from top to bottom. Coaching power for each team is distributed across the team's respective leaderboard with the fans in the top spots having the greatest amount of influence, and the fans at the bottom having the least. Leaderboard rankings are determined based on a number of factors including, but not limited to, the total amount of FAN tokens owned, total amount of FAN tokens earned in a specified time period, and offensive and defensive statistics accumulated when fans call successful plays for their team.

Individual Play Calling—Imagine sitting on your couch watching the game and receiving a notification on your phone that "You, and you alone, are calling the next play!" Multiple times per game individuals and small groups of FAN token holders are selected to call a play—providing an opportunity to be the team's sole Offensive Coordinator for that play. Here again, blockchain transparency is essential in fans' confidence that the play they call is the play on the field.

Wagering—The methods and systems described herein can leverage peer to peer wagering functionality. Tremendous momentum and precedent has already been created by decentralized prediction markets such as Augur, Gnosis and Stox.

Championship Prizes—For example, a championship game in a particular sports league can have a minimum, large dollar prize (e.g., $1M) on the line. Players and coaches of the winning team share in 50% of the prize pool. Certain fans of the team that wins the championship game also share in 50% of the championship prize, allocated across a number of categories including, but not limited to: number of successful plays called, passing yards gained, rushing yards gained, and touchdowns scored.

VIP Tiers—VIP tiers based on FAN token ownership include complimentary VIP tickets to games, special seating and in-venue access for FAN token holders, free Virtual Front Office subscriptions, unique in-app avatars, invites to exclusive events, first to know breaking news, and more.

Rewards & Prizes—FAN token owners are eligible to win prizes and rewards via sweepstakes. Sweepstakes prizes range from team merchandise and game consoles to one-of-a-kind fan experiences and travel packages to see a game in person. For example, sweepstakes can be held at least once a month during the season, with each FAN token providing an entry into the random drawing. In certain embodiments, in order to be eligible for the sweepstakes, fans must have been active in the interactive sports management app during the week prior to the drawing.

Play-Calling Win Bonus—During each game of the season, the fans of the winning team who called plays and participated during the game receive FAN tokens.

Discounts—Special FAN token-only discounts on merchandise, tickets, fan experiences, in-app purchases, and more. Discounts are tiered with the highest discounts reserved for the very top FAN token owners and earners.

In-App Purchases—FAN tokens can be used to purchase "voting boosts," game-day experiences, limited-edition merchandise, Virtual Front Office access, and more.

Future Token Issuances—If in the future a particular sports league or competition issues tokens with broader rights than FAN tokens, including, for example, tokens that confer ownership in and/or control over the teams in the sports league, the sports league can provide holders of FAN tokens priority access to the purchase of such tokens.

Fans can earn FAN tokens by engaging with the interactive sports management system at a variety of touch points, including:

Watching games;

Calling plays and accumulating offensive and defensive stats e.g. passing yards, rushing yards, touchdowns, and sacks;

Viewing written and streaming video content on the league's website and mobile app;

Participating in polls and team coaching decisions such as drafting players and setting the week's starting lineup;

Maintaining an active Virtual Front Office subscription;

Providing value-added activities to teams such as scouting players and helping coaching staffs evaluate opponents;

Referring friends and family to join the league's fan base;

Engaging with league sponsors;

Creating league-related content including blog posts and videos;

User-generated opportunities.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 3A & 3B illustrate example screenshots of a user interface on a user device, according to an embodiment of the invention.

DETAILED DESCRIPTION

Figure 1:
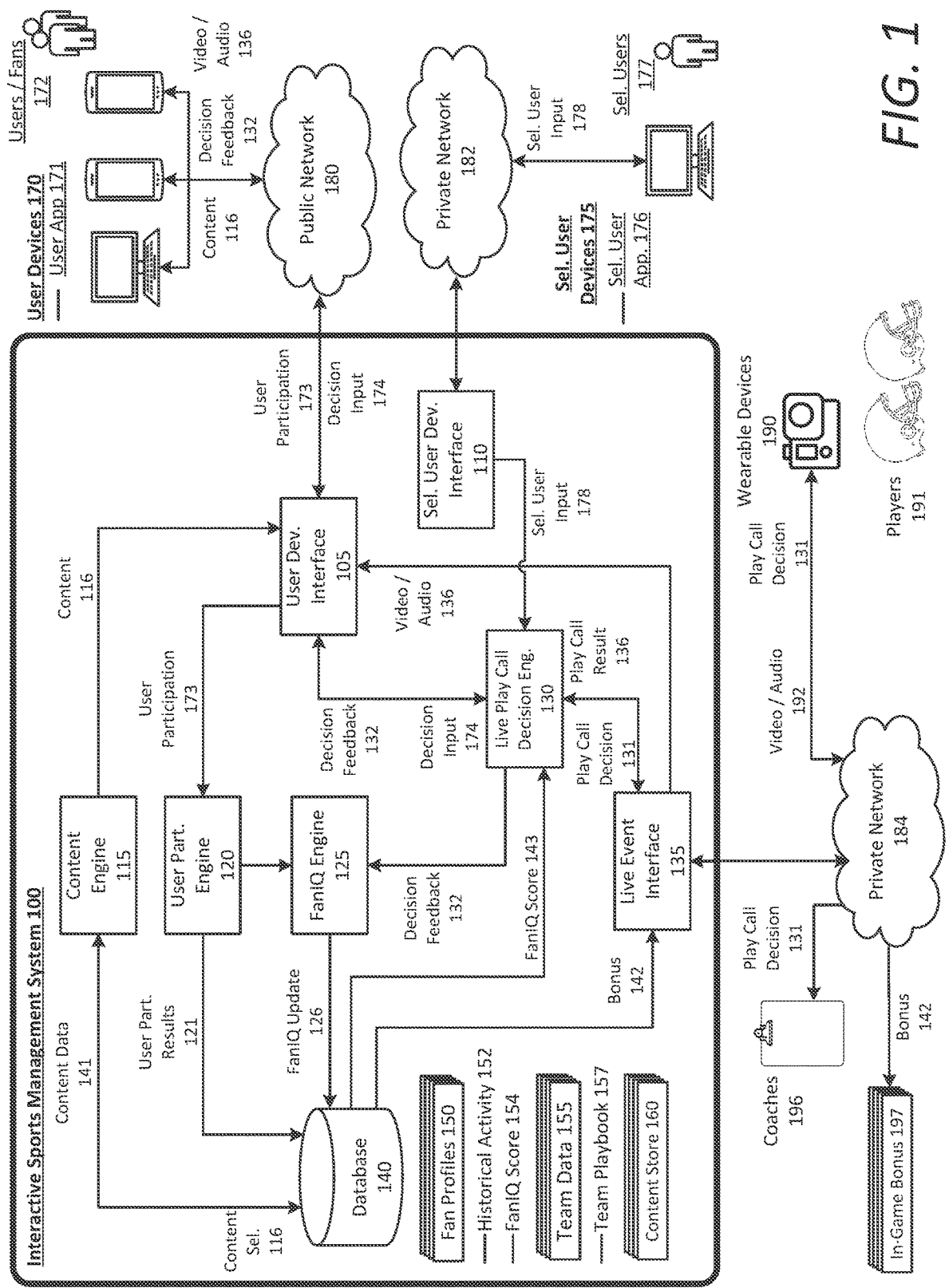
FIG. 1 is a block diagram illustrating an example interactive sports management system in communication with user devices, in accordance with an embodiment of the invention.

FIG. 1 is a block diagram illustrating an example interactive sports management system in communication with user devices, in accordance with an embodiment of the invention. In examples described herein, the interactive sports management system 100 allows users or fans 177 to participate in the management of a live-action sports team in an immersive manner, including making real-time decisions that affect the outcome of the sporting events (e.g., football, baseball, basketball, soccer, hockey etc.). In various aspects, through the use of the interactive sports management system 100, users/fans associated with a team 172 can provide input regarding various decisions pertaining to the team (e.g., live play calling decisions, team playbook management, team personnel management, etc.). The interactive sports management system 100 receives the inputs and generates a decision based, at least in part, on each user's 172 input and the respective rankings of the user 172 among users associated with the team based on, for example, a FanIQ score and/or FAN token balance. In some examples, a number of users 172 can be chosen (e.g., based on the FanIQ score and/or FAN token balance) as selected users 177 to perform enhanced roles in one or more decision-making processes for the team (e.g., live play calling).

According to embodiments, interactive sports management interactive sports management system 100 can include a user device interface 105, a selected user interface 110, a content engine 115, a user participation engine 120, a FanIQ engine 125, a live play call decision engine 130, a live event interface 135, and a database 140. The interactive sports management system 100 communicates with user devices 170 of users/fans 172 that execute or run user application 171 over a network 180 (e.g., the Internet). During a live sporting event, the interactive sports management system 100 can communicate with coaches 196 and wearable devices 190 of players 191 of a sports team over a private network 184. In some examples, the interactive sports management system 100 also communicates with selected user devices 175 of selected users 177 that execute or run selected user applications 176 over a private network 182. The private networks 182 and 184 can be the same network or can be disparate private networks.

In various aspects, the interactive sports management system 100 includes a user device interface 105 to communicate with user devices 170 operated by users or fans associated with a team 172 over a network 180. The user devices 170 execute or run user applications 171 that provide one or more user interfaces to the users 172 to interact with the interactive sports management system 100. For instance, the user application 171 can provide the users 172 a user interface to provide input regarding decisions for a particular sports team, or a user interface to review plays and learn about the sport. The network 180 can be the Internet, for example. The user device interface 105 can receive user participation 106 and decision input 107 from the user devices 170.

According to various implementations, the interactive sports management system 100 includes a content engine 115 that generates content for display on user devices 170. The content engine receives content data 141 from database 140 (e.g., a content store 160) to generate content 116, which is transmitted to the user devices 170 via the user device interface 105 and public network 180. Content 116 can include a user interface to provide a user input for a decision pertaining to the team (e.g., a live play call decision, team playbook management, team personnel management, etc.), a user interface to participate in fan-based contests (e.g., a trivia contest), content pertaining to learning about the sport and/or the team (e.g., videos, tutorials, guides, etc.), live game score content (e.g., scoreboard, box score, real-time statistics etc.), content to view information pertaining to the team and/or a league in which the team competes (e.g., league or team news, table standings, player or team statistics), and the like.

For instance, the content engine 115 can generate content 116 such as a user interface allowing a user to provide input for a live play call decision during a live sporting event (e.g., an American football game). A figure illustrating a screenshot of an exemplary user interface for providing a user input for a live play call decision is depicted in FIG. 3A. The content 116 in this context can include a number of play call choices (e.g., selected from the team play book 157 in the database 140) displayed to the user 172 on user device 170. The play call choices can be selected from the team play book 157 based on an in-game situation during the live sporting event. For example, the content engine 115 can select a number of passing plays for display to users 172 based on a third-and-long situation in a football game.

In certain implementations, the content engine 115 can generate content 116 to allow the users 172 to participate in various other aspects of the management of the team. For example, the content engine 115 can generate content 116 to allow users 172 to provide input or vote for the team's player personnel decisions (e.g., draft a player or trade a player). The content engine 115 can also generate content 116 to allow users 172 to interact with coaches 196 to create or modify playbooks for the team 157. The team playbooks can be stored in database 140 as team data 155.

Additionally, the content engine 115 can generate content to provide users 172 with scores, updates, and/or news regarding the users' teams or the league in which the users' teams compete. The content engine 115 can also generate content pertaining to user competitions (e.g., a trivia competition) held before live sporting events to determine, for example, real-world bonuses (e.g., extra timeouts) for the users' teams. For instance, a team's users can win a user competition held before a football game to give the team additional timeouts during the football game.

In certain implementations, the interactive sports management system 100 further includes a user participation engine 120 which receives user participation 173 from user devices 170 via public network 180 and user device interface 105. In various aspects, the user participation 173 can include user activity pertaining to user competitions. In other examples, the user participation 173 can correspond to user activity on forums, chat groups, blackboards or other user venues included or provided by the interactive sports management system 100. Furthermore, the user participation 173 can include user input regarding team personnel decisions (e.g., draft a player or trade a player). The user participation engine 120 generates user participation results 121, which can be stored in the database 140 (e.g., as historical activity 152 of fan profile 150). As one example, user participation results 121 regarding a user competition can be stored in the database 140. The user participation results 121 for the user competitions can be used to determine bonuses 142 for teams during competitions.

In some examples, the interactive sports management system 100 includes a FanIQ engine 125 to compute a metric or a score (e.g., a FanIQ score) for each of the users of the system, the score being used to rank users associated with a team to, for example, assign a respective weight to each users' input in determining a decision pertaining to the team (e.g., a play calling decision). The ranking of a user among users associated with the same team (e.g., the team's user or fan base) can be used to determine the weight of the user's input in determining decisions pertaining to the team. The FanIQ score for a particular user can be determined or updated based on the particular user's activity or interactions with the interactive sports management system. According to embodiments, a FanIQ score for a particular user can be indicative of the particular user's knowledge of the sport, knowledge of the team, involvement in the team's management, etc. For instance, the interactive sports management system 100 can reward user activity that increases a user's knowledge of the sport or the team (e.g., studying the team's playbook 157 and watching video replays) and such activities may be incentivized by the interactive sports management system 100 to increase a user's FanIQ score. As another example, a particular user's FanIQ score can vary depending on how the particular user votes for live play calls during a game via, for example, decision feedback 132. The live play call decision engine 130 can generate decision feedback 132 to indicate how a particular user voted in comparison with other users associated with the team. For instance, if the particular user consistently votes for plays that are ultimately selected as the play call decisions 131, the particular user's FanIQ score can be increased as a result. On the other hand, if the particular user consistently votes for plays that are not selected as the play call decisions 131, the particular user's FanIQ score can be decreased (or remain unchanged) as a result. The FanIQ engine generates a FanIQ update 126 to update a FanIQ score 154 stored in the fan profile 150 of the corresponding user. In addition to or as an alternative, the FanIQ score 143 can be updated or determined based on an in-game (e.g., on-the-field) result of the selected play call decision 131. For instance, FanIQ engine 125 can receive decision feedback 132 that includes an in-game result of a selected play call (e.g., gain of six yards). In response, the FanIQ engine 125 can generate FanIQ update 126 to update each the FanIQ scores of each of the users that voted for the selected play call based on the in-game result. For instance, a user 172 can submit a decision input 174 for a "Screen Pass" play. The interactive sports management system 100 can select the "Screen Pass" play as the play call decision 131 based on input from a plurality of users. After the "Screen Pass" play is executed on the field by the team, the interactive sports management system 100 can generate a feedback such as decision feedback 132 to indicate an in-game result of the "Screen Pass" play (e.g., gain of six yards). The feedback, including the result of the "Screen Pass" play can be received by the FanIQ engine 125 to update the FanIQ score of the user 172.

In certain implementations, the interactive sports management system includes a live play call decision engine 130 to generate a play call decision 131 based on received user input (e.g., decision input 174). In various examples described herein, the play call decision 131 can be a direction for the team and its players to execute a plan of action or a strategy during the live sporting event. The play call decision 131 can specify a formation, a route, a player substitution, and the like. For example, in the context of a football game, the play call decision 131 can be a specific pass play (e.g., a slant or a post), a specific run play (e.g., a run up the middle), a defensive scheme (e.g., a pass rush, a zone coverage), etc. The play call decision 131 can be generated based on decision input 174 from users 172 associated with the team. For example, for a particular in-game situation, users 172 can submit input regarding the play call decision 131 using respective user devices 170 (e.g., content pertaining to the play call decision 131 can be generated by content engine 115). The users 172 can be given a window of time (e.g., ten seconds) to submit input regarding the play call decision 131. Decision input 174 submitted during the window of time will be taken into account in generating the play call decision 131 by the live play call engine 130. Any decision input 174 submitted outside the window of time will not be taken into account in generating the play call decision 131.

According to embodiments, the live play call engine 130 determines the play call decision 131 based on the received user decision input 174. The live play call engine 130 can, for example, selects the play call with the most user votes as the play call decision 131. In certain implementations, the live play call decision engine 130 can assign a weight to each user decision input 174 to generate the play call decision 131. For example, each user decision input 174 can be multiplied by a weighting factor in the determination of the play call decision 131. In some examples, the live play call engine 130 receives a metric or a score such as FanIQ score 143 associated with each user 172. The FanIQ score 143 of a particular user 172 can be used to determine the weight assigned to the particular user's 172 decision input 174 in generating the play call decision 131. As described herein, the FanIQ score 143 can be used to rank users 172 associated with a particular team. A decision input 174 from a user 172 with a high FanIQ score 143 can be weighted more heavily (e.g., receives a higher weighting factor) than a decision input 174 from a user 172 with a low FanIQ score 143. In this manner, the live play call decision engine 130 can generate the play call decision 131 by taking into account each participating user's experience, knowledge, and or prior participation levels, as embodied each participating user's respective FanIQ score.

In certain implementations, the live play call decision engine 130 receives selected user input 178 from selected user devices 175 operated by selected users 177 via selected user device interface 110. Selected users 177 can be a selected number (e.g., five or ten) users 172 who are chosen to have greater involvement in the determination of play call decisions 131 during a live sporting event. The selected users 177 can be chosen based on their respective FanIQ scores. For instance, users 172 with the highest FanIQ scores can be chosen to be the selected users 177. The selected users 177 can also be chosen as prizes for user competitions. In certain implementations, the selected users 177 can be chosen by one or more criteria relating to the users' historical interactions with the interactive sports management system 100. For instance, users 172 who are most active in interacting with the interactive sports management system 100 over a specific period (e.g., a week or two weeks) can be chosen as selected users. In various aspects, the interactive sports management system 100 can select users on a periodic basis (e.g., before each live sporting event, every week, etc.). The selected user devices 175 may be located at the venue of the sporting event (e.g., inside a stadium or arena) and may communicate with the selected user device interface 110 via a private network 182 (e.g., private wireless network), which may be optimized to reduce latency, delay, and/or interference and maximize reliability. Furthermore, the selected user devices 175 can be dedicated terminals or devices executing selected user applications 176 to allow the selected users 177 to provide the selected user input 178.

According to embodiments, for a certain percentage of instances (e.g., 75% or 80% of instances) the live play call decision engine 130 can generate the play call decision 131 based on selected user input 178. For the remaining percentage of instances (e.g., 25% or 20% of instances) the live play call decision engine 130 can generate the play call decision based on user decision input 174. For instance, the interactive sports management system 100 and content engine 115 can be configured such that for 80% of play calls, the selected users 177 are presented with user interfaces to provide selected user input 178, while the users 172 are not. For the remaining 20% of play calls, the content engine 115 provides content 116 to the users devices 170 to allow users 172 to provide user decision input 174 such that the live play call decision engine 130 can generate play call decisions 131 based on the user decision input 174. In other implementations, the live play call decision engine 130 can generate a play call decision 131 based on a combination of the user decision input 174 and the selected user input 178. For instance, the user decision input 174 can be used to determine two plays from the team's playbook 157 to run and the selected user input 178 can be used to choose one of the two plays as the play call decision 131. In certain examples, the interactive sports management system 100 can be configured to reserve certain play call decisions (e.g., last two minutes of a game) to either users 172 or selected users 177.

In certain implementations, the live play call decision engine 130 receives play call result 136 from the live event interface 135. The play call result 136 can indicate an in-game (e.g., on-the-field) result of the selected play call (e.g., as indicated by play call decision 131) after it is executed by the players 191 and/or coaches 196 during the live sporting event. The play call result 136 can indicate, for example, that the selected play call resulted in a gain of six yards for the team. The live play call decision engine 130 can generate the decision feedback 132 to include the play call result 136 such that the FanIQ engine 125, which receives the decision feedback 132, can update the FanIQ scores of the users that voted for the selected play call based on the play call result 136. In other examples, live play call decision engine 130 can update the fan profiles 150 based on the play call result 136. For example, a user profile of a user who voted for the selected play call can be updated to include the play call result 136. In this manner, the interactive sports management system 100 can keep track of in-game statistics (e.g., yards gained, points scored, runs batted in, etc.) for each of the users based on in-game results of plays for which they voted. In various aspects, the interactive sports management system 100 can rank the users according to such in-game statistics. Such a ranking based on in-game statistics can be updated in real-time during a live sporting event. The interactive sports management system 100 can also maintain and update such in-game statistics for each user over the course of a sports season. In this manner, the users can be ranked, for example, on a cumulative number of yards gained or a cumulative number of points scored over the course of a season.

According to embodiments, the interactive sports management system 100 can include a live event interface 135 to communicate with players 191 and coaches 196. In some examples, the live event interface 135 communicates with wearable devices 190 of players 191 to communicate play call decision 131. For example, the wearable devices 190 can display the play call decision 131 such that the players 191 can execute the selected play during the game. Furthermore, the wearable device 190 can include one or more cameras and a microphone to transmit video/audio data 192 to interactive sports management system 100. The live event interface 135 can transmit the video/audio data 192 to user device interface 105 such that user devices 170 can receive one or more live video/audio feeds from the players 196. In certain implementations, the users 172 can select among a plurality of video/audio feeds from players 191 (e.g., one video/audio feed per player on the field) and from coaches 196. In various examples, a private network 184 connects the live event interface 135 with coaches 196, players 191, and the wearable devices 190. The private network 184 (e.g., a private wireless network) can be optimized to reduce latency, delay, and/or interface and maximize reliability.

The live event interface 135 can also receive a bonus 142 from the database 140. The bonus 142 can represent a bonus or reward given to a team based on participation by the team's associated users in various contests or competitions (e.g., online trivia competition etc.). The bonus 142 can represent an in-game and on-field bonus such as an additional timeout, an additional first down, etc. The live event interface 135 can communicate the bonus 142 to the sporting event venue as in-game bonus 197. According to embodiments, the in-game bonus 197 can be viewed by the players 196, coaches 191, users 172, selected users 177, and other spectators of the live sporting event.

Methodology

Figure 2:
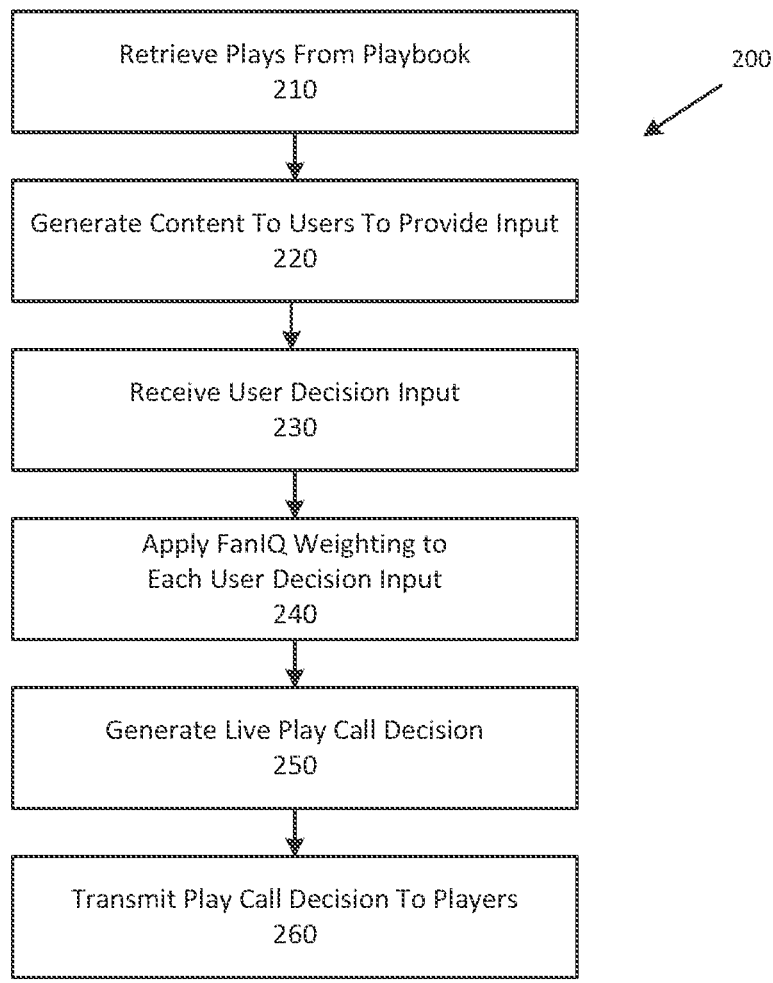
FIG. 2 is a flow chart describing an example method of generating a live play call decision by an example interactive sports management system, according to an embodiment of the invention.

FIG. 2 is a flow chart describing an example method of generating a live play call decision by an example interactive sports management system, according to examples described herein. In the below discussion of the FIG. 2, reference may be made to reference characters representing like features as shown and described with respect to FIG. 1. Furthermore, the processes described with respect to FIG. 2 may be performed by an example interactive sports management system 100 as shown and described with respect to FIG. 1. Referring to FIG. 2, the interactive sports management system 100 can perform process 200 to determine a live play call decision (e.g. play call decision 131) during a live-action sporting event (e.g., a football game). The interactive sports management system 100 retrieves a number of plays from a particular team's playbook (e.g., playbook 157) for presentation to users (210). For instance, the interactive sports management system 100 can select four or six plays for presentation to users 172 such that the users 172 can provide their input in selecting one of the plays. The selection of plays from the playbook can be based on a current situation pertaining to the live-action sporting event (e.g., a third-and-four situation). For instance, on a third-and-long situation, the interactive sports management system 100 can be configured to select a number of passing plays.

It should be appreciated that, in some embodiments, the interactive sports management system 100 structures a team's playbook 157 according to situational buckets (e.g., parameters like down and distance, time on the clock, score, and the like) in order to quickly and efficiently select a number of plays that are most relevant or applicable to the game situation. In one embodiment, a coach of the team uploads his or her entire playbook to the database 140, and the interactive sports management system 100 automatically allocates each play to one or more situational buckets as described above. In addition, the coach (or in some embodiments, the interactive sports management system 100) can assign each play a ranking or weight (e.g., 0-100) in each bucket, which indicates a certain priority for the play. For example, a play with a higher ranking in a certain bucket may be displayed to the users for selection more often than a play in the same bucket that has a lower ranking. In this way, the present interactive sports management system 100 is particularly advantageous over certain existing sports management systems, because there is no delay from having a coach determine which number of plays should be displayed to the users at the time the play must be called in the game.

In addition, in some embodiments, the plays in each bucket can further be associated with one or more categories associated with the play. Exemplary categories can include, but are not limited to, a degree of difficulty or complexity of the play (e.g., trick play, double lateral), a type of the play (e.g., pass vs. run), a formation or personnel grouping that executes the play (e.g., four wide receivers, I-formation, man in motion, special teams, etc.). It should be appreciated that other categories can be contemplated within the scope of the technology described herein.

The interactive sports management system 100 generates content (e.g., a user interface) for providing a user input for a live play call decision, including the selected number of plays from the playbook (220). The generation of content can be performed by, for example, the content engine 115. A figure illustrating a screenshot of an exemplary user interface for providing a user input for a live play call decision is depicted in FIG. 3A. The generated content (e.g. content 116) can be transmitted to user devices 170 via user device interface 105. The generated content can then be displayed by the user devices 170 for presentation to the users 172.

The interactive sports management system 100 receives user decision input (e.g., decision input 174) from each of the users 172 associated with the team. According to embodiments, each user 172 provides user decision input by selecting one of the plays presented on the user device 170. In various examples described herein, the interactive sports management system 100 permits users 172 to submit play selection within a given window of time (e.g., ten seconds). Input submitted during the window of time can be taken into account to generate the play call decision 131. Input submitted outside the window of time may be discarded and/or ignored by the interactive sports management system 100. In this manner, the live sporting event can be maintained without significant disruptions caused by the user input for play call decisions.

According to embodiments, the interactive sports management system 100 applies FanIQ weighting to each user decision input (240). The interactive sports management system 100 can retrieve a FanIQ score or a rank of each of the users associated with the team and can be configured to weigh each user's decision input based on the corresponding FanIQ score or user ranking. For instance, the interactive sports management system 100 can multiply each user input by a weighting factor to take into account the FanIQ score or ranking of each user. Subsequently, the interactive sports management system 100 generates a live play call decision (250) and transmits the play call decision to players (260) such that the play call can be implemented by the players during the live sporting event.

Exemplary User Interface

FIGS. 3A-B illustrate example screenshots of a user interface on a user device, according to examples described herein. In the below description of FIGS. 3A-B, reference may be made to reference characters representing like features as shown and described with respect to FIGS. 1-2. FIG. 3A illustrates an example screenshot of a user interface 300 for providing a user play call decision input (e.g., decision input 174). The user interface 300 includes a live score 301 illustrating a current live score between opposing teams in a live sporting event. In this case, the live score 301 illustrates a score for a football game. The user interface 300 also includes a situation indicator 302. The situation indicator 302 includes an in-game situation (e.g., "Ball at the SPO 20-yard line") and a graphic illustrating the status of the current drive. The user interface 300 further includes an input timer 303 (e.g., "10 seconds remaining"). The input timer 303 informs the user 172 that the user 172 has a certain amount of time remaining to input a selection. Inputs made before the input timer 303 expires will be taken into account in generating a live play call. Inputs made after the input timer 303 expires will be discarded or ignored. The user interface 300 further includes four plays selected from the team's play book based on the current in-game situation, including input options 304-1 ("Run-Dig Left"), 304-2 ("Pass-Deep Corners"), 304-3 ("Run-Sweep Right"), and 304-4 ("Pass-Go Route"). The user 172 can select one of the input options 304-1, 304-2, 304-3, or 304-4 by clicking, tapping, or touching the input option areas on the screen of the user device 170.

FIG. 3B illustrates an example screenshot of a user interface 310 informing the user of a play call decision generated by the interactive sports management system 100. The user interface 310 includes a live score 311 that informs the user 172 of the current score of the football game. The user interface 310 also includes play call results 312. The play call results 312 displays each of the four plays presented to the users as input options 304-1, 304-2, 304-3, and 304-4. The play call results 312 also displays a percentage of users who voted for each of the plays as well as the generated play call decision. In this instance, 40 percent of the users selected Go Routes (input option 304-4), which was the generated play call decision.

Hardware Diagram

Figure 4:
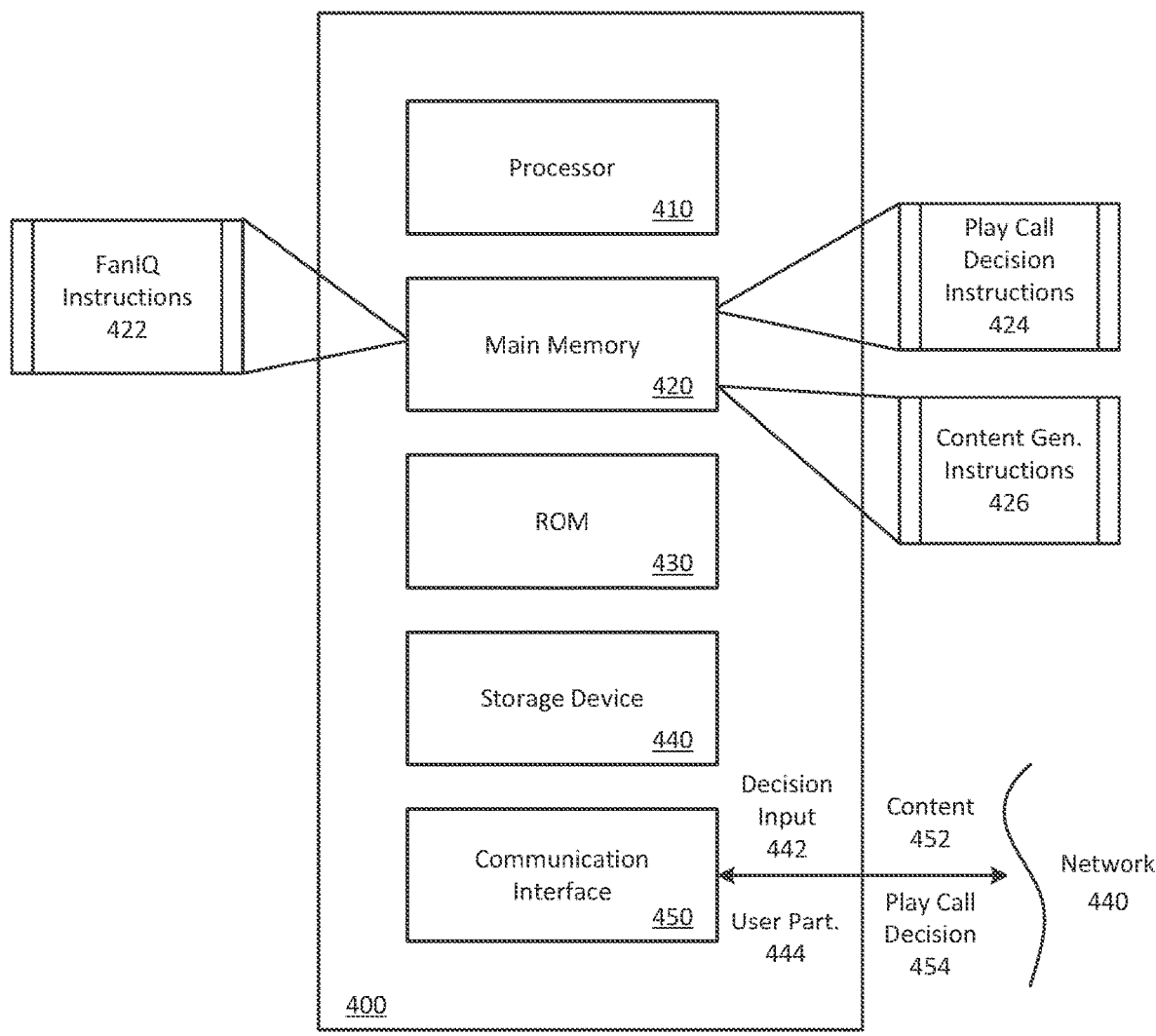
FIG. 4 is a block diagram illustrating a computer system upon which examples described herein may be implemented.

FIG. 4 is a block diagram illustrating a computer system upon which examples described herein may be implemented. A computer system 400 can be implemented on, for example, a server or combination of servers. For example, the computer system 400 may be implemented as part of a network service. In the context of FIG. 1, the interactive sports management system 100 may be implemented using a computer system 400 such as described by FIG. 4. The interactive sports management system 100 may also be implemented using a combination of multiple computer systems as described in connection with FIG. 4.

In one implementation, the computer system 400 includes processing resources 410, a main memory 420, a read-only memory (ROM) 430, a storage device 440, and a communication interface 450. The computer system 400 includes at least one processor 410 for processing information stored in the main memory 420, such as provided by a random access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk, solid state storage device (e.g., SSD), or optical disk, is provided for storing information and instructions.

The communication interface 450 enables the computer system 400 to communicate with one or more networks 480 (e.g., Ethernet, cellular network) through use of the network link (wireless or wired). Using the network link, the computer system 400 can communicate with one or more computing devices and/or one or more servers. In accordance with examples, the computer system receives decision input 442 from users. The executable instructions stored in the memory 430 can include play call decision instructions 424 to generate, for example, the live play call decisions based on decision input 442. In doing so, the computer system can receive decision input 442 from each of a plurality of users associated with a particular sports team, and the processor 410 can execute the play call decision instructions 424 to generate the live play call decisions 454.

The executable instructions stored in the memory 420 can also include FanIQ instructions, which enable the computer system 400 to determine FanIQ scores of each of the plurality of users associated with the team. In addition, the memory 420 can also include content generation instructions 426, which enable the computer system 400 to generate content for display on user devices 170.

By way of example, the instructions and data stored in the memory 420 can be executed by the processor 410 to implement an example interactive sports management system 100 of FIG. 1. The processor 410 is configured with software and/or other logic to perform one or more processes, steps and other functions described with implementations, such as described by FIGS. 1-3B, and elsewhere in the present application.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A computerized method of enabling remote participation in baseball game decision-making, the method comprising:

retrieving, by a server computing device, plays applicable to a current baseball game situation from a playbook stored in a database, wherein each play in the playbook is assigned to one or more buckets that define a specific baseball game situation and the server computing device identifies the plays for retrieval by comparing the current baseball game situation to the specific baseball game situation associated with one or more of the buckets, identifying at least one category of plays from among categories of plays assigned to one of the buckets wherein the categories of plays include a type of play category, and retrieving plays associated with the identified category from the playbook;

generating, by the server computing device, a play call user interface comprising the retrieved plays and transmitting the play call user interface to fan computing devices associated with fans of the baseball game;

receiving, by the server computing device, a vote for one of the retrieved plays from each of the fan computing devices;

determining, by the server computing device, a selected play of the retrieved plays based on the received votes; and transmitting, by the server computing device, the selected play to at least one of: (i) one or more player computing devices associated with players involved in the baseball game and (ii) one or more coach computing devices associated with one or more coaches of the players, wherein the players carry out the selected play during the baseball game.

2. The system of claim 1, wherein the current baseball game situation is comprised of one or more data elements including player at bat, team at bat, runners on base, player pitching, players in field positions, inning, top or bottom of inning, score, or any combination thereof.

3. The system of claim 2, wherein the specific baseball game situation assigned to each of the one or more buckets comprises one or more of: player at bat, team at bat, runners on base, player pitching, players in field positions, inning, top or bottom of inning, or score.

4. The system of claim 2, wherein the server computing device matches at least one of the one or more data elements relating to the current baseball game situation to the specific baseball game situation assigned to one or more of the buckets to identify the categories for retrieval.

5. The system of claim 4, wherein the server computing device matches at least one of the one or more data elements relating to the current baseball game situation to the specific baseball game situation assigned to one or more of the buckets to identify the plays within those categories for retrieval.

6. The system of claim 1, wherein the category selection portion of the play call user interface comprises a display of each of the categories of plays in a grid format, and each of the displayed categories is associated with an input that, when selected by a user of the fan computing device, instantiates the play selection portion of the play call user interface, which comprises a display of each of the retrieved plays corresponding to the selected category in a grid format, and each of the displayed plays is associated with an input that, when selected by a user of the fan computing device, transmits a vote for the displayed play to the server computing device.

7. The system of claim 1, wherein each of the fan computing devices comprises a fan profile associated with a user of the fan computing device.

8. The system of claim 7, wherein the fan profile comprises a ranking of the associated user.

9. The system of claim 8, wherein the ranking of the associated user is based on one or more of: the user's interactions with the server computing device during the baseball game, or the user's interactions with the server computing device during one or more previous baseball games.

10. The system of claim 8, wherein determining a selected play of the retrieved plays based on the received votes comprises:
    determining a weight for each of the received votes using the ranking of the associated user that submitted the vote;
    adjusting a value associated with each of the received votes based upon the determined weight for each of the received votes; and
    identifying a selected play of the retrieved plays based upon the adjusted values of each of the received votes.

11. The system of claim 8, wherein the ranking of the associated user is based on a cryptocurrency token balance associated with the user.

12. The system of claim 11, wherein the cryptocurrency token is based upon blockchain technology.

* * * * *